(12) United States Patent
Allred et al.

(10) Patent No.: US 10,389,849 B2
(45) Date of Patent: Aug. 20, 2019

(54) SERVER-CONTROLLED USER INTERFACE

(75) Inventors: Curtis Allred, Bellevue, WA (US);
Geoffrey Bonser, Bellevue, WA (US);
Eric Fu, Bellevue, WA (US); Michael Libes, Bainbridge Island, WA (US)

(73) Assignee: HERE Global B.V., Veldhoven (NL)

( * ) Notice: Subject to any disclaimer, the term of this patent is extended or adjusted under 35 U.S.C. 154(b) by 284 days.

(21) Appl. No.: 12/428,434

(22) Filed: Apr. 22, 2009

(65) Prior Publication Data

US 2010/0077362 A1 Mar. 25, 2010

Related U.S. Application Data (60) Provisional application No. 61/047,068, filed on Apr. 22, 2008.

(51) Int. Cl.
| | |
|---|---|
| *H04L 29/08* | (2006.01) |
| *G06F 9/451* | (2018.01) |
| *G06F 16/957* | (2019.01) |
| *G06F 16/958* | (2019.01) |

(52) U.S. Cl.
CPC .............. *H04L 67/34* (2013.01); *G06F 9/452* (2018.02); *G06F 16/9574* (2019.01); *H04L 67/125* (2013.01); *G06F 16/9577* (2019.01); *G06F 16/986* (2019.01); *H04L 67/303* (2013.01)

(58) Field of Classification Search
CPC .... G06F 9/4443; G06F 9/44; G06F 17/30899; G06F 17/30994; G06F 3/04845; G06F 3/04847; G06F 3/04842; G06F 3/0481; G06F 3/0484; G06F 8/34; G06F 8/30; G06F 17/30861; G06F 17/30902; G06F 9/452; G06F 9/445; G06F 9/465; G06F 16/986; G06F 16/972; G06F 16/9574; G06F 16/9577; H04L 29/06; H04L 29/06095; H04L 67/34; H04L 67/38; H04L 67/303; H04L 41/509
USPC ....... 715/866, 762, 746, 744, 740, 718, 760; 345/333, 329
See application file for complete search history.

(56) References Cited

U.S. PATENT DOCUMENTS

| | | | | |
|---|---|---|---|---|
| 6,223,178 | B1 * | 4/2001 | Himmel | G06F 17/30884 |
| 6,728,698 | B2 * | 4/2004 | Yen | G06F 17/30899 |
| 6,731,314 | B1 * | 5/2004 | Cheng | G06F 17/30873 |
| | | | | 707/E17.111 |
| 6,859,924 | B1 * | 2/2005 | Kroening | G06F 8/60 |
| | | | | 717/173 |
| 6,928,490 | B1 * | 8/2005 | Bucholz | G06F 19/327 |
| | | | | 340/12.32 |
| 7,069,554 | B1 * | 6/2006 | Stammers | G06F 9/445 |
| | | | | 709/220 |

(Continued)

OTHER PUBLICATIONS

Vierinen et al., "Dynamic markup language based user interfaces for a browser", Proceedings of the IASTED International Conference Communications, Internet and Information Technology, Nov. 18, 2002, pp. 54-59.

(Continued)

*Primary Examiner* — Rinna Yi (74) *Attorney, Agent, or Firm* — Ditthavong & Steiner, P.C.

(57) ABSTRACT

A distributed computational system, with local and remote processing components, is configured to provide a user interface of the local component that is stored in the local component but is controlled and updated by the remote component.

9 Claims, 7 Drawing Sheets

(56) References Cited

U.S. PATENT DOCUMENTS

| | | | |
|---|---|---|---|
| 7,107,594 B1* | 9/2006 | Fischer | G06F 17/30905 707/999.102 |
| 7,512,899 B1* | 3/2009 | Hoiem | G06F 9/4443 715/762 |
| 7,593,780 B2* | 9/2009 | Mann | G05B 19/042 700/17 |
| 7,594,107 B1* | 9/2009 | Parkhill | H04L 63/0823 713/156 |
| 7,620,948 B1* | 11/2009 | Rowe | G06F 8/65 717/171 |
| 7,636,080 B2* | 12/2009 | Rosenberg | A63F 13/10 345/156 |
| 7,861,239 B2* | 12/2010 | Mayfield | G06F 11/1433 717/168 |
| 7,877,087 B2* | 1/2011 | Liwell | H04L 12/585 379/142.06 |
| 7,949,999 B1* | 5/2011 | Willeford | G06F 8/67 717/101 |
| 8,010,701 B2* | 8/2011 | Wilkinson | G06F 9/505 709/217 |
| 2002/0032673 A1* | 3/2002 | Yen | G06F 17/30899 |
| 2002/0078143 A1 | 6/2002 | De Boor et al. | |
| 2005/0021678 A1* | 1/2005 | Simyon | H04L 29/06 709/219 |
| 2005/0071754 A1* | 3/2005 | Morgan | G06F 17/30864 715/273 |
| 2006/0056315 A1* | 3/2006 | Oman | H04L 41/08 370/254 |
| 2006/0078046 A1* | 4/2006 | Lu | H04N 19/172 375/240.01 |
| 2006/0089147 A1* | 4/2006 | Beaty | H04W 4/00 455/445 |
| 2006/0248062 A1 | 11/2006 | Libes et al. | |
| 2007/0022286 A1* | 1/2007 | Makni | H04L 9/32 713/163 |
| 2007/0060114 A1* | 3/2007 | Ramer | G06Q 30/08 455/418 |
| 2007/0143672 A1* | 6/2007 | Lipton | G06F 17/30899 715/205 |
| 2008/0065974 A1* | 3/2008 | Campbell | G06Q 10/107 715/200 |
| 2008/0104257 A1* | 5/2008 | Olston | G06F 17/30902 709/228 |
| 2008/0126308 A1* | 5/2008 | Wooldridge | G06F 17/30864 |
| 2008/0148251 A1* | 6/2008 | Yang | G06F 8/665 717/171 |
| 2008/0184146 A1* | 7/2008 | Kimball | G06F 3/0481 715/765 |
| 2008/0320225 A1* | 12/2008 | Panzer | G06F 17/30902 711/130 |
| 2009/0150851 A1* | 6/2009 | Boer | G06F 9/44536 717/100 |
| 2009/0204422 A1* | 8/2009 | James | G06F 8/65 705/2 |
| 2010/0223133 A1* | 9/2010 | Scott | G06Q 30/02 705/14.54 |
| 2010/0245388 A1* | 9/2010 | Bauch | H04L 67/125 345/634 |
| 2010/0269048 A1* | 10/2010 | Pahlavan | G06F 9/4445 715/740 |
| 2011/0166935 A1* | 7/2011 | Armentrout | G06Q 30/00 705/14.54 |
| 2014/0019435 A1* | 1/2014 | Ceri | G06F 17/30864 707/712 |

OTHER PUBLICATIONS

Chamberlain, "Building web application in domino 6: browser caching and response header rules", INET, IBM, Oct. 1, 2002, 10 pages, retrieved from the internet on Nov. 2, 2009 at <http://www.ibm.com/developerworks/lotus/library/ls-resp_head_rules/index.html>.

Dumont, "A preview of browser-side caching enhancements", INET, IBM, Jan. 2, 2003, 7 pages, retrieved from the internet on Nov, 2, 2009 at <http://www.ibm.com/developerworks/lotus/library/ls-Cache_enhance/>.

* cited by examiner

SERVER-CONTROLLED USER INTERFACE

CROSS-REFERENCES TO RELATED APPLICATIONS

This application claims the benefit of U.S. Provisional Application Ser. No. 61/047068 entitled "Server Controlled User Interface" by Curt Allred et al. filed Apr. 22, 2008. Priority of the filing date is hereby claimed, and the disclosure of the prior application is hereby incorporated by reference.

BACKGROUND

A common distributed systems architecture typically divides computational processing between local (a.k.a. client) and remote (a.k.a. server) components, with communications via a wired or wireless communications network. In designing such systems, two processes for implementing the local user interface are typical. In one process, the user interface is a core subsystem of the local component, and can only be changed by replacing the whole local component. In the other process, the local user interface is specified by the remote component, typically using a "markup" language.

A personal computer Web browser demonstrates a hybrid of these two processes. The browser is the local component of the system. The user interface of the browser itself is "built in" and can only be changed by updating the browser software. The user interface of the World Wide Web services, however, are defined by HTML and Flash markup code, sent from various Web servers (a.k.a. remote components). That is, the user interfaces of the Web services comprise remote components.

A user interface determined by a local component is free of issues such as latency and resource efficiency, but a user interface determined by a remote component is more easily controlled and updated.

SUMMARY

A distributed computational system, with local and remote processing components, is configured to provide a user interface of the local component that is stored in the local component but is controlled and updated by the remote component. This configuration ensures operational responsiveness from the local component but retains control and updating in the remote component.

Other features and advantages of the present invention should be apparent from the following description of the preferred embodiment, which illustrates, by way of example, the principles of the invention.

DETAILED DESCRIPTION

Figure 1:
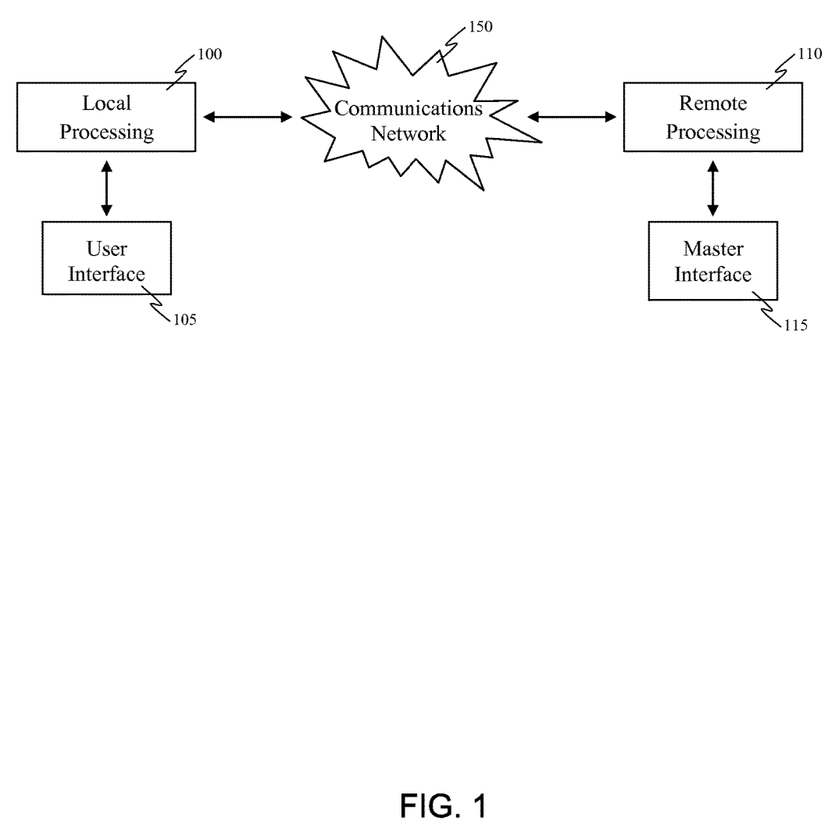
FIG. 1 is a diagram of a distributed cache architecture to provide the server controlled user interface.

A system constructed in accordance with the invention comprises a distributed computational system as shown in FIG. 1, with local 100 and remote 110 processing components connected via a wired or wireless communications network 150. The local processing component 100 includes memory storage that provides a user interface 105. The user interface 105 is controlled by the remote processing component 110, based on a master interface 115 stored in the remote processing component. The user interface 105 may be provided, for example, from operation of an application executing at the local processing component 100. As described further below, the local processing component 100 and remote processing component 110 can each comprise a computer system, with memory storage and processing units with presentation of the respective interfaces through components such as a display device, audio devices, and the like.

In this document, references to "Medio" are references to the assignee of the present invention, Medio Systems, Inc. of Seattle, Wash., USA.

Figure 2:
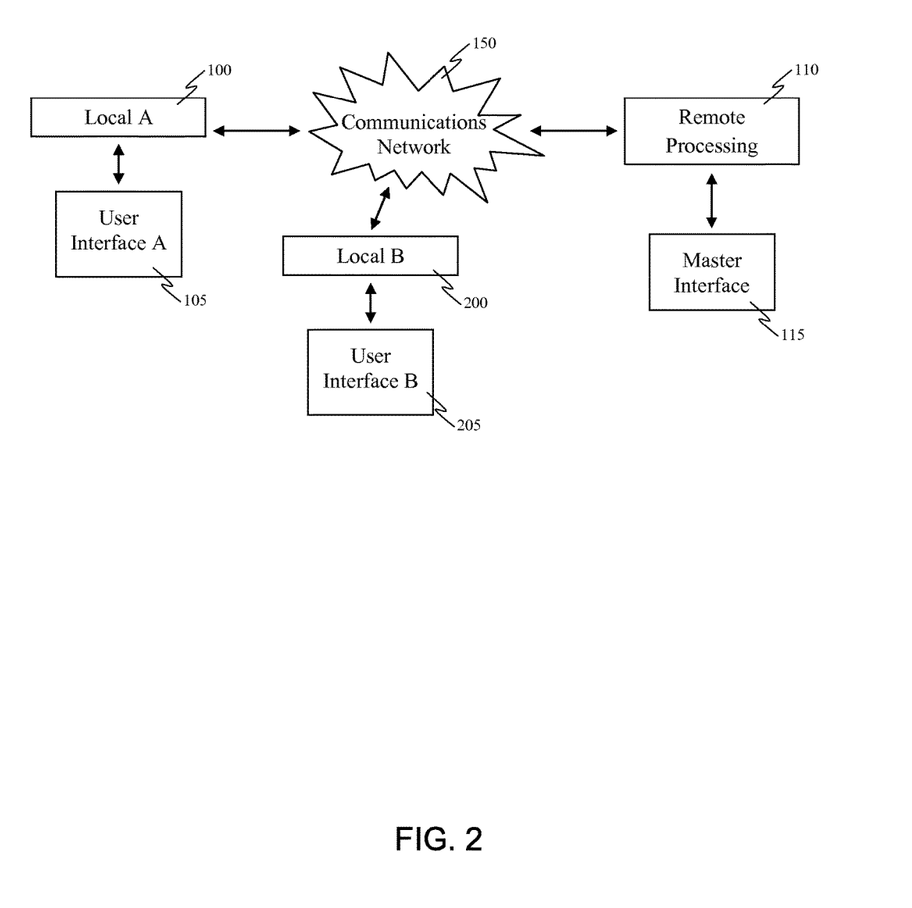
FIG. 2 is a diagram of an architecture with multiple local processing components.

In the FIG. 1 architecture, multiple local processing components can be utilized. For example, FIG. 2 shows multiple local components "Local A" 100 and "Local B" 200, each local processing component 100, 200 communicating with a shared remote processing component 110 over the network 150. Each local processing component 100, 200 includes its own user interface 105, 205 respectively. FIG. 2 illustrates this architecture with two local processing components. It should be clear this architecture can be expanded to any number of local processing components.

Figure 3:
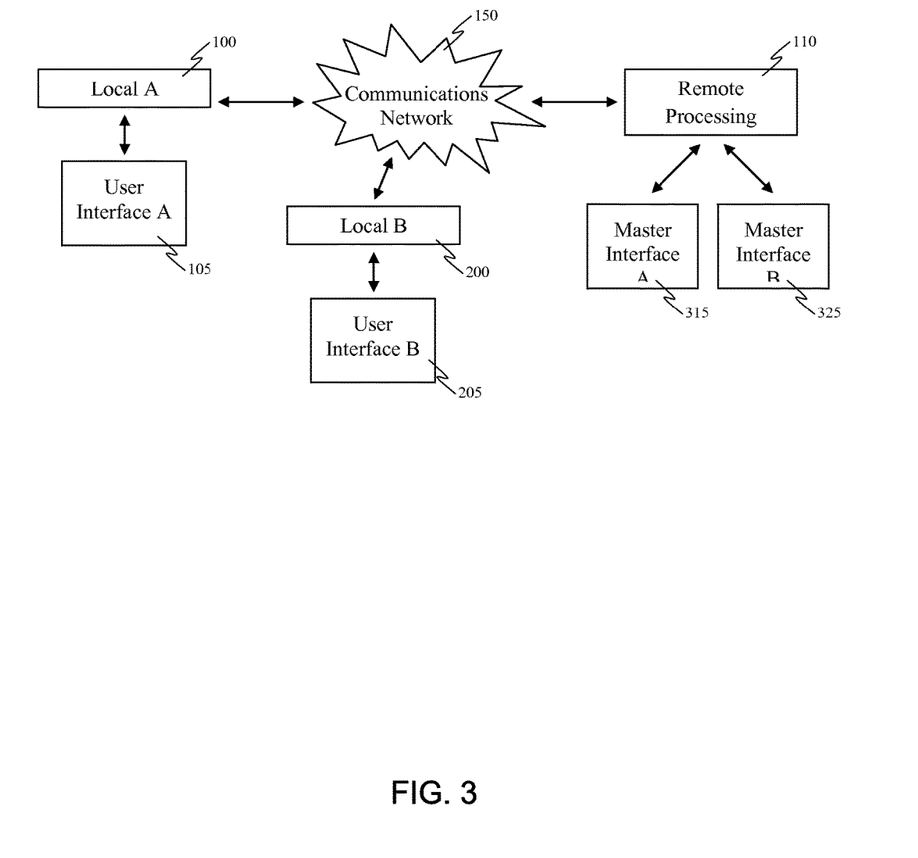
FIG. 3 is a diagram of an architecture with multiple master interfaces.

In FIG. 2, the master interface 115 is identical for all local processing components. This need not be the case for all implementations. FIG. 3 shows an embodiment in which the remote processing component 110 includes separate master interfaces, comprising Master Interface A 315 and Master Interface B 325, corresponding to each of the local processing components 100, 200, respectively. As the number of local processing components increases, each may include its own master interface. In this way, the remote master interfaces can be personalized for the local user. That is, the master interface can generate user interface data to provide a user interface that is adapted for the user computing system to which the user interface data is provided. Alternatively, collections of local processing components may share a single instance of a master interface, in effect combing the architectures from FIGS. 2 and 3. That is, the master interface can generate a plurality of user interface data packages, providing a separate user interface data package for each of a plurality of user computing systems. For example, multiple local processing components such as Local A, Local B, and Local C, may be implemented according to a shared Master Interface 1, and other multiple local processing components such as Local D, Local E, and Local F, may be implemented according to a shared Master Interface 2. Again, each remote master interface 315, 325 can be personalized for the local users.

The local user interface components 105, 205 of FIGS. 1, 2, and 3 may include multiple sub-components. The specific sub-components will vary depending on the specific requirements of the respective local processing components. An example collection of local user interface sub-components specific to Medio Systems' mobile search application is displayed in FIG. 4.

Figure 4:
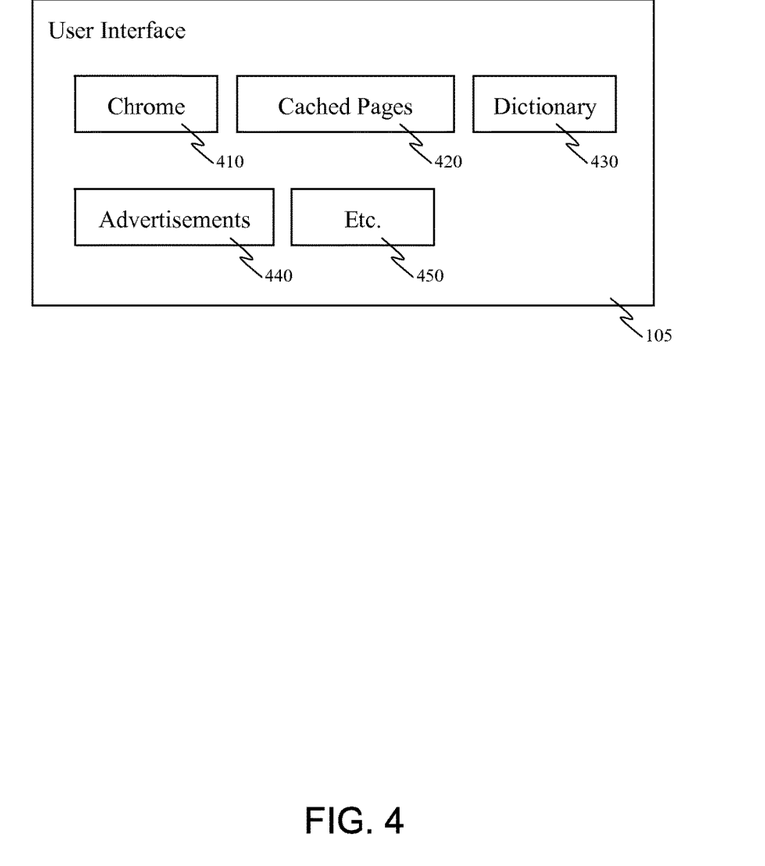
FIG. 4 is a depiction of sub-components of the local user interface.

FIG. 4 shows that these sub-components include:

The application "Chrome" 410, i.e. the logos, header, footer, edges, menus, and other elements which do not change between sets of user interface pages. Having these elements stored in the user interface sub-component 105 of local processing component allows near instant display of the user interface, while allowing the look-and-feel of the application to be updated by the remote processing component as needed.

Cached pages 420, including the home page of the application and other pages likely to be viewed by the user of the application. Having these pages cached on the local processing component decreases the latencies seen in a browser-based application, making the Medio application "feel" more like a non-distributed application, and decreasing the amount of communications required across the communications network 150.

Medio's mobile search user interface includes a predictive dictionary, displaying possible matching queries as a search is entered. This dictionary 430 is stored in the local processing component, greatly decreasing the amount of communications required across the communications network 150.

Medio's application displays advertisements throughout the user interface, and many of these advertisements 440 are stored in the user interface sub-component 105 of local processing component.

For other applications, and other elements of the user interface 450 may be stored in the user interface sub-component 105 of a local processing component.

These FIG. 4 elements are under the control of the remote processing component 110. For example, the entire local user interface sub-component 105 can be updated en masse by the remote component 110, or the individual user interface sub-components (410, 420, 430, 440, and 450) can be updated individually by the remote component. Or as someone skilled in the art can envision, each of these sub-components can in turn be comprised of sub-sub-components that can be updated separately.

Unlike a typical distributed system cache (e.g. a cache for a Web browser), the information within the local user interface sub-component 105 is controlled by the remote processing component 110, not the local processing component 100. This ensures that the local user interface 105 can always be displayed correctly. This configuration ensures that a provider of the user interface 105 has sole control over the "look and feel" of the user interface, without latency issues and the like noted previously. It should be noted that the FIG. 4 construction does not eliminate the need for, nor preclude the inclusion of, a local cache for other information, e.g. a Web browser cache for containing cached images from browser pages.

Figure 5:
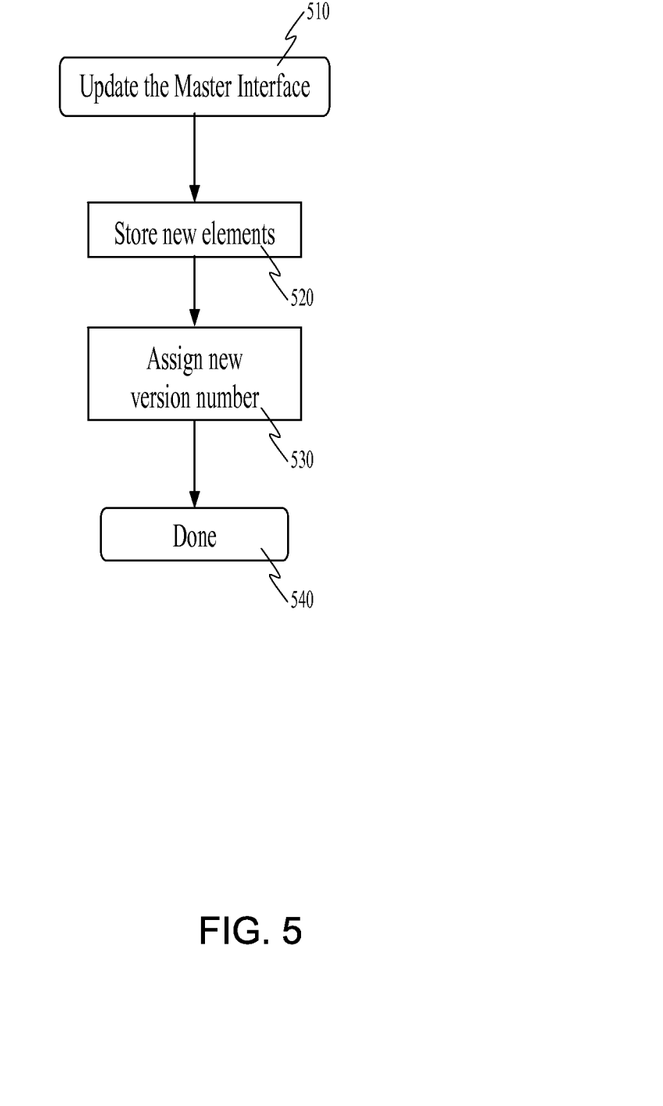
FIG. 5 is a flow diagram showing operations performed by the systems illustrated in FIGS. 1, 2, 3 for updating the Master Interface.
Figure 6:
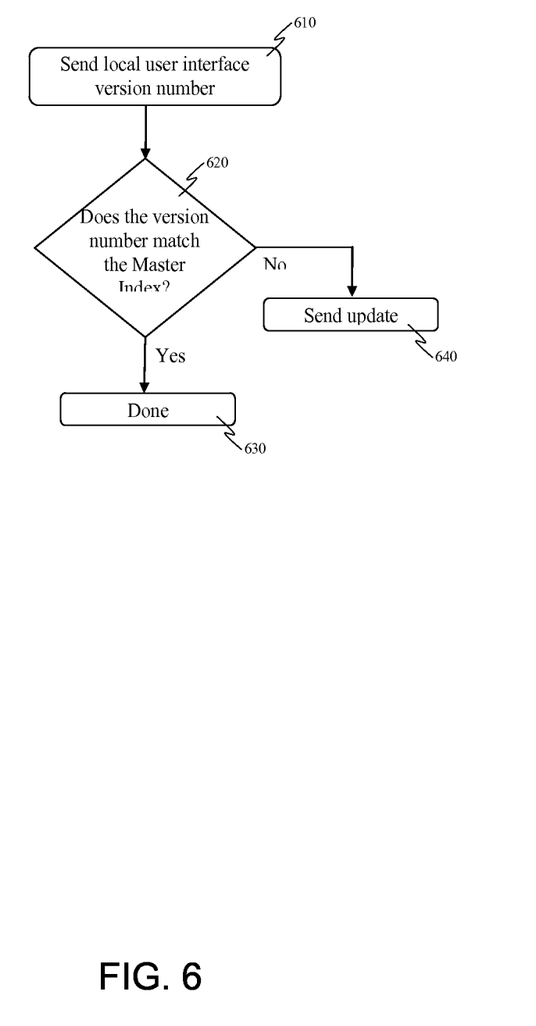
FIG. 6 is a flow diagram showing operations performed by the systems illustrated in FIGS. 1, 2, 3 for updating the local User Interface sub-component from a Master Interface component.

The processes for updating the user interface in the remote Master Interface (also referred to as Master Index) and the local User Interface sub-components is displayed in the flow diagrams of FIGS. 5 and 6.

FIG. 5 shows the flow for updating the Master Interface in step 510. For the simple architectures that contain a single Master Interface 115, such as illustrated in FIGS. 1 and 2, this process is simple. The updated elements are stored within the Master Interface in step 520, and in step 530, a unique version number is assigned to this update. These two steps are performed in an "atomic" operation to ensure the newly updated elements are never associated with the previous version number before updating is done in step 540.

FIG. 6 shows the process of updating the local User Interface sub-component from a Master Interface component. This process begins when a local processing component communicates with the remote processing component. As seen in step 610; this begins with the local processing component sending it's user interface version number to the remote processing component. In step 620, the remote processing component compares this version number with the version number of the Master Interface 115 to determine if there is a match (i.e., they are the same). If the two version numbers match, no update is required in step 630. If the version numbers do not match, an update is sent in step 640. This update is in addition to any other communications being passed between the local and remote processing components, making the user interface updates invisible to the user.

The complexity in implementing the construction described herein grows in the architecture displayed in FIG. 3, where the remote processing component contains multiple Master Indices (315 and 325), and more so as the number of local processing components grows into the millions, each sharing a smaller collection of Master Interfaces (not shown). The inclusion of multiple Master Interface components (315, 325) is part of Medio's mobile search architecture. Furthermore, the local user interface sub-components shown in FIG. 4 are typically shared differently across each of the local processing components (see the description above in connection with FIG. 4). Despite this complexity, the basis for keeping all the local user interface sub-components up to date is identical with the processes outlined in FIGS. 5 and 6. Each sub-component within each Master Index is assigned a version number, the local processing components send over a set of version numbers rather than a single version number, the remote processing component compares all the version numbers, and any mismatched version numbers result in user interface updates.

The usefulness of sharing Master Indices grows as the choice of Master Index become more personalized to the individual user. Looking back on the User Interface sub-components in FIG. 4, it should be clear that the chrome 410 can be identical for most (if not all) local processing components. The cached pages 420 may be identical, but to create a personalized user interface, various sets of pages can be generated for different types of users, and shared according to the taste of a specific user. Similarly, the dictionary 430 may be identical across all user interfaces, but it too may be personalized to the individual tastes of a specific user. And again a specific set of advertisements 440 can be chosen for a specific user.

Exemplary Implementations

The systems and methods described above may be implemented in a number of ways. One such implementation includes various electronic components. For example, units of the various systems may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 7:
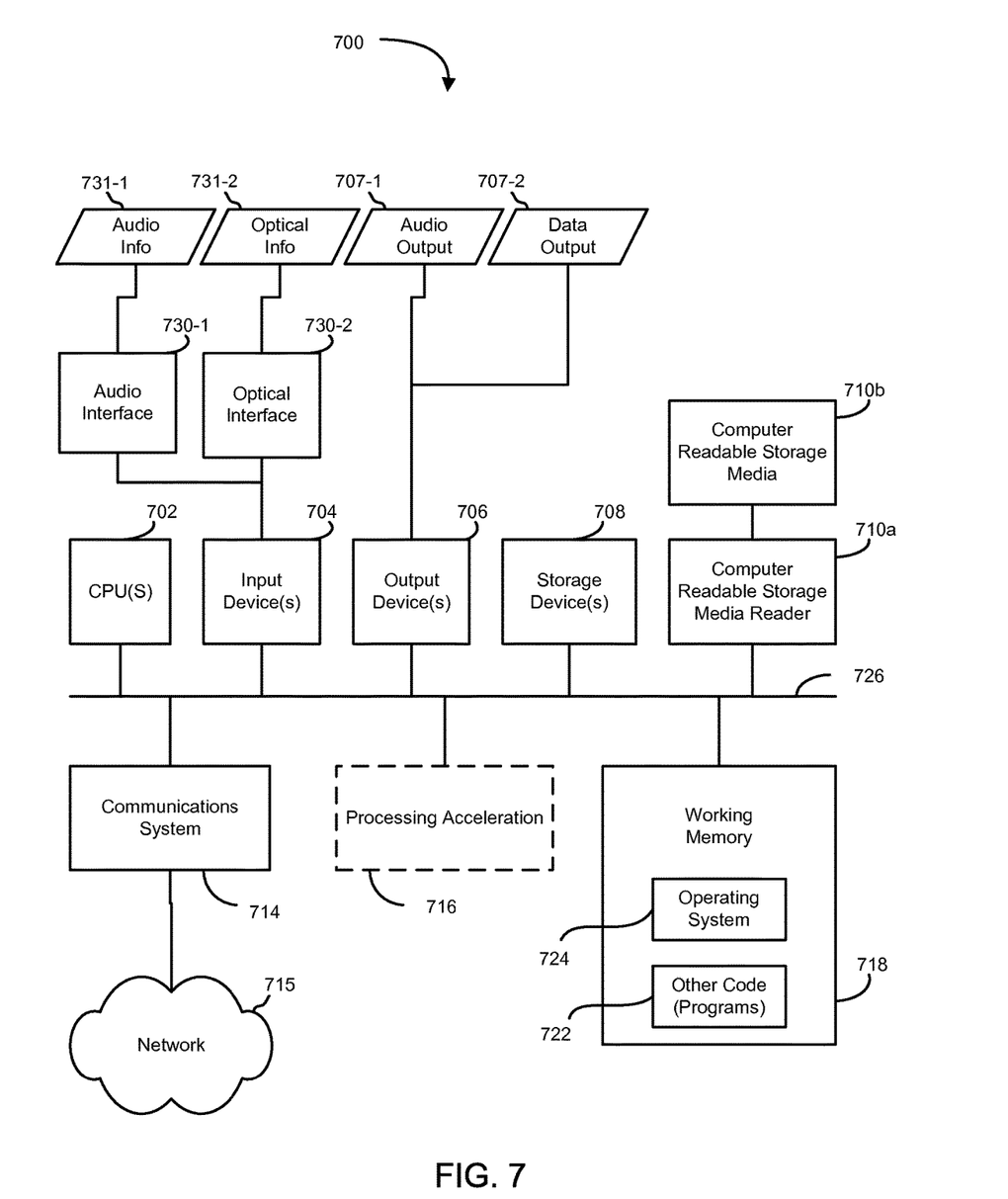
FIG. 7 is a block diagram of a computational system for implementing the illustrated embodiments of FIGS. 1-6.

FIG. 7 provides a block diagram of a computational system 700 for implementing embodiments of the invention. In one embodiment, the computation system 700 may function as the local processing component 100 or as the remote processing component 110 shown in FIGS. 1-3. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computational system 700 is shown comprising hardware elements that can be electrically coupled via a system bus 726 (or may otherwise be in communication, as appropriate). The hardware elements can include one or more central processor units (CPUs) 702, including without limitation one or more general-purpose processors and/or one or more special-purpose processors (such as communication processing chips, graphics acceleration chips, and/or the like); one or more input devices 704, that can include, without limitation, a mouse, a keyboard, and/or the like; and one or more output devices 706, which can include without limitation a display device, a printer, audio device, and/or the like.

The computational system 700 may further include (and/or be in communication with) one or more storage devices 708, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computational system 700 might also include a communications subsystem 714, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 714 may permit data to be exchanged with a network 715, and/or any other devices described herein. The network 715 may comprise a local area network (LAN) or a network such as the Internet, or a combination. In many embodiments, the computational system 700 will further include a working memory 718, which can include a RAM or ROM device, as described above. The system may optionally include processing acceleration 716 to assist with processing, such as arithmetic computations, graphical computations, and the like.

The computational system 700 also may comprise software elements, shown as being currently located within the working memory 718, including an operating system 724 and/or other code, such as one or more application programs 722, which may comprise computer programs performing tasks and operations described above, and/or may be designed to implement methods in accordance with the invention and/or configure systems in accordance with the invention, as described herein. Merely by way of example, one or more procedures described with respect to the method(s) discussed above might be implemented as code and/or instructions executable by a computer (and/or a processor within a computer). In one embodiment, the data generating and presenting operations are implemented as application programs 722. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 710b. In some embodiments, the computer readable storage medium 710b may comprise the storage device(s) 708 described above. In other embodiments, the computer readable storage medium 710b might be incorporated within the computer system. In still other embodiments, the computer readable storage medium 710b might be separate from the computer system (i.e., it may be a removable readable medium, such as a compact disc, etc.), and or might be provided in an installation package, such that the storage medium can be used to program a general purpose computer with the instructions/code stored thereon. These instructions might take the form of executable code, which is executable by the computational system 700 and/or might take the form of source and/or installable code, which, upon compilation and/or installation on the computational system 700 (e.g., using any of a variety of generally available compilers, installation programs, compression/decompression utilities, etc.), then takes the form of executable code. In these embodiments, the computer readable storage medium 710b may be read by a computer readable storage media reader 710a.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In some embodiments, one or more of the input devices 704 may be coupled with an audio interface 730-1. The audio interface 730-1 may be configured to receive audio information 731-1 by interfacing with a microphone, instrument, digital audio device, or other audio signal or file source. In other embodiments, one or more of the input devices 704 may be coupled with an optical interface 730-2. The optical interface 730-2 may be configured to receive optical information 731-2 by interfacing with a camera, scanner, digital imaging device, or other digital image source.

Further, in some embodiments, one or more of the output devices 706 may be coupled with an audio output device 707-1. The audio output device 707-1 may be configured to output audio signal data generated by embodiments of the invention to one or more systems or devices capable of handling that data, for example a speaker, audio component, digital-to-analog converter, compact disc writer, and the like. In other embodiments, one or more of the output devices 706 may be coupled with a data output device 707-2. The data output device 707-2 may be configured to output data generated by embodiments of the invention to one or more systems or devices capable of handling that data, for example data processing software, publication systems, file storage devices, and the like.

In one embodiment, the invention employs local and remote computer systems (such as the computational system 700) to perform methods of the invention. According to a set of embodiments, some or all of the procedures of such methods are performed by the computational system 700 in response to the processor 702 executing one or more sequences of one or more instructions (which might be incorporated into the operating system 724 and/or other code, such as an application program 722) contained in the working memory 718. Such instructions may be read into the working memory 718 from another machine-readable medium, such as one or more of the storage device(s) 708 (or 710). Merely by way of example, execution of the sequences of instructions contained in the working memory 718 might cause the processor(s) 702 to perform one or more procedures of the methods described herein.

The terms "machine readable medium" and "computer readable medium," as used herein, refer to any medium that participates in providing data that causes a machine to operate in a specific fashion. In an embodiment implemented using the computational system 700, various machine-readable media might be involved in providing instructions/code to processor(s) 702 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (708 or 710). Volatile media includes, without limitation, dynamic memory, such as the working memory 718. Transmission media includes coaxial cables, copper wire, and fiber optics, including the wires that comprise the bus 726, as well as the various components of the communication subsystem 714 (and/or the media by which the communications subsystem 714 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 702 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 700. These signals, which might be in the form of electromagnetic signals, acoustic signals, optical signals, and/or the like, are all examples of carrier waves on which instructions can be encoded, in accordance with various embodiments of the invention.

The communications subsystem 714 (and/or components thereof) generally will receive the signals, and the bus 726 then might carry the signals (and/or the data, instructions, etc. carried by the signals) to the working memory 718, from which the processor(s) 702 retrieves and executes the instructions. The instructions received by the working memory 718 may optionally be stored on a storage device 708 either before or after execution by the processor(s) 702.

The present invention has been described above in terms of a presently preferred embodiments so that an understanding of the present invention can be conveyed. There are, however, many configurations for providing user interface processing not specifically described herein but with which the present invention is applicable. The present invention should therefore not be seen as limited to the particular embodiments described herein, but rather, it should be understood that the present invention has wide applicability with respect to user interface processing generally. All modifications, variations, or equivalent arrangements and implementations that are within the scope of the attached claims should therefore be considered within the scope of the invention.

We claim:

1. A remote processing component system configured to communicate via a network with a plurality of local processing devices each of which is installed with a respective user interface, wherein the respective user interface includes a user interface component including user interface sub-components separately determined and updated by the remote processing component system, comprising:
    at least one memory that stores a plurality of master interfaces, wherein each of the plurality of master interfaces comprises a master interface component including master interface sub-components, wherein each of the plurality of master interfaces corresponds to the respective user interface, each of the master interface sub-components within each of the plurality of master interfaces is assigned with a version number of a corresponding master interface, and each version number of the master interface sub-components of the remote processing component system corresponds to the respective user interface sub-component of the plurality of local processing devices;
    at least one communications interface configured to receive from one of the local processing devices a set of version numbers of the user interface sub-component version numbers that are stored in a local cache at the local processing device and send them to the remote processing component system to separately identify each of the user interface sub-components corresponding to the master interface sub-components for the one of the local processing devices; and
    at least one processor configured to compare the set of version numbers of the user interface sub-component received from the one of the local processing devices with the version numbers of the corresponding master interface sub-components for a match,
    when determining one of the version numbers of the master interface sub-components does not match with the one of the version numbers of the user interface sub-components received from the one of the local processing devices, update the corresponding master interface, store the updated user interface sub-component within the corresponding master interface, assign a new version number to the updated master interface, and send the updated user interface sub-component to the one of the local processing devices;
    wherein the remote processing system includes a web server;
    wherein each of the user interface sub-components includes (a) respective components of a web browser application that is executed by the local processing device after the update is received and, upon execution, provides an updated web browser application that provides a local user interface for the web browser application, (b) a plurality of cached pages for display by the web browser application while it is executed, (c) a predictive dictionary, stored in whole at the local processing device, used in processing, only at the local processing device, new search queries submitted through the web browser application to determine one or more matching queries, the one or more matching queries each based entirely on the locally stored dictionary, and (d) a plurality of advertisements for display via the local user interface by the web browser application while it is executed, wherein the plurality of advertisements is stored in the user interface sub-components of the local processing device, and wherein the user interfaces of the local processing device include some user interface sub-components that do not change between sets of user interface components, share a set of master interfaces and produce the updated user interface that is personalized for the local processing device.

2. A system as in claim 1, wherein at least two of the local processing devices each include the local cache that stores user interface sub-components, and at least one of the user interface sub-components in the local cache of one of the local processing devices is different from the user interface sub-components in the local cache of the other local processing devices.

3. A system as in claim 1, wherein the plurality of master interfaces are personalized for each local user.

4. A method of operating a remote processing component system including at least one memory, at least one communications interface, and at least one processor, wherein the remote processing component system is configured to communicate via a network with a plurality of local processing devices each of which is installed with a respective user interface, wherein the respective user interface includes a user interface component including user interface sub-components separately determined and updated by the remote processing component system, the method comprising:

storing, at the at least one memory, a plurality of master interfaces, wherein each of the plurality of master interfaces comprises a master interface component including master interface sub-components, wherein each of the plurality of master interfaces corresponds to the respective user interface, each of the master interface sub-components within each of the plurality of master interfaces is assigned with a version number of a corresponding master interface, and each version number of the master interface sub-components of the remote processing component system corresponds to the respective user interface sub-component of the plurality of local processing devices;

receiving, at the at least one communications interface from one of the local processing devices, a set of version numbers of the user interface sub-component version numbers that are stored in a local cache at the local processing device and send them to the remote processing component system to separately identify each of the user interface sub-components corresponding to the master interface sub-components for the one of the local processing devices;

comparing, at the at least one processor, the set of version numbers of the user interface sub-component received from the one of the local processing devices with the version numbers of the corresponding master interface sub-components for a match, when determining one of the version numbers of the master interface sub-components does not match with the one of the version numbers of the user interface sub-components received from the one of the local processing devices, updating the corresponding master interface, storing the updated user interface sub-component within the corresponding master interface, assigning a new version number to the updated master interface, and sending the updated user interface sub-component to the one of the local processing devices;

wherein the remote processing system includes a web server;

wherein each of the user interface sub-components includes (a) respective components of a web browser application that is executed by the local processing device after the update is received and, upon execution, provides an updated web browser application that provides a local user interface for the web browser application, (b) a plurality of cached pages for display by the web browser application while it is executed, (c) a predictive dictionary, stored in whole at the local processing device, used in processing, only at the local processing device, new search queries submitted through the web browser application to determine one or more matching queries, the one or more matching queries each based entirely on the locally stored dictionary, and (d) a plurality of advertisements for display via the local user interface by the web browser application while it is executed, wherein the plurality of advertisements is stored in the user interface sub-components of the local processing device, and wherein the user interfaces of the local processing device include some user interface sub-components that do not change between sets of user interface components, share a set of master interfaces and produce the updated user interface that is personalized for the local processing device.

5. A method as in claim 4, wherein at least two of the local processing devices each include the local cache that stores user interface sub-components, and at least one of the user interface sub-components in the local cache of one of the local processing devices is different from the user interface sub-components in the local cache of the other local processing devices.

6. A method as in claim 4, wherein the remote plurality of master interfaces is personalized for each local user.

7. A non-transitory computer-readable storage medium for operating a remote processing component system, wherein the remote processing component system is configured to communicate via a network with a plurality of local processing devices each of which is installed with a respective user interface, wherein the respective user interface includes a user interface component including user interface sub-components separately determined and updated by the remote processing component system, and wherein the non-transitory computer readable-storage medium carries one or more sequences of one or more instructions which, when executed by one or more processors, cause an apparatus to perform:

storing, at the at least one memory, a plurality of master interfaces, wherein each of the plurality of master interfaces comprises a master interface component including master interface sub-components, wherein each of the plurality of master interfaces corresponds to the respective user interface, each of the master interface sub-components within each of the plurality of master interfaces is assigned with a version number of a corresponding master interface, and each version number of the master interface sub-components of the remote processing component system corresponds to the respective user interface sub-component of the plurality of local processing devices;

receiving, at the at least one communications interface from one of the local processing devices, a set of version numbers of the user interface sub-component version numbers that are stored in a local cache at the local processing device and send them to the remote processing component system to separately identify each of the user interface sub-components corresponding to the master interface sub-components for the one of the local processing devices;

comparing, at the at least one processor, the set of version numbers of the user interface sub-component received from the one of the local processing devices with the version numbers of the corresponding master interface sub-components for a match, when determining one of the version numbers of the master interface sub-components does not match with the one of the version numbers of the user interface sub-components received from the one of the local processing devices, updating the corresponding master interface, storing the updated user interface sub-component within the corresponding master interface, assigning a new version number to the updated master interface, and sending the updated user interface sub-component to the one of the local processing devices;

wherein the remote processing system includes a web server;

wherein each of the user interface sub-components includes (a) respective components of a web browser application that is executed by the local processing device after the update is received and, upon execution, provides an updated web browser application that provides a local user interface for the web browser application, (b) a plurality of cached pages for display by the web browser application while it is executed, (c) a predictive dictionary, stored in whole at the local processing device, used in processing, only at the local processing device, new search queries submitted through the web browser application to determine one or more matching queries, the one or more matching queries each based entirely on the locally stored dictionary, and (d) a plurality of advertisements for display via the local user interface by the web browser application while it is executed, wherein the plurality of advertisements is stored in the user interface sub-components of the local processing device, and wherein the user interfaces of the local processing device include some user interface sub-components that do not change between sets of user interface components, share a set of master interfaces and produce the updated user interface that is personalized for the local processing device.

8. A non-transitory computer-readable storage medium as in claim 7, wherein at least two of the local processing devices each include the local cache that stores user interface sub-components, and at least one of the user interface sub-components in the local cache of one of the local processing devices is different from the user interface sub-components in the local cache of the other local processing devices.

9. A non-transitory computer-readable storage medium as in claim 7, wherein the plurality of master interfaces is personalized for each local user.

* * * * *